United States Patent [19]

Morino

[11] Patent Number: 5,278,394
[45] Date of Patent: Jan. 11, 1994

[54] FIXING TEMPERATURE CONTROLLER FOR CONTROLLING A HEATER RELATIVE TO TWO PRESET TEMPERATURE LEVELS

[75] Inventor: Shigeru Morino, Atami, Japan

[73] Assignee: Tokyo Electric Co., Ltd., Tokyo, Japan

[21] Appl. No.: 777,181

[22] Filed: Oct. 16, 1991

[30] Foreign Application Priority Data

Oct. 19, 1990 [JP] Japan .................................. 2-279363
Jun. 25, 1991 [JP] Japan .................................. 3-153104

[51] Int. Cl.$^5$ ............................................. H05B 1/02
[52] U.S. Cl. .................................... 219/497; 219/501; 219/508; 219/494; 219/216; 323/369
[58] Field of Search ............... 219/494, 216, 497, 501, 219/505, 492, 508-510; 323/369; 307/117

[56] References Cited

U.S. PATENT DOCUMENTS

| | | | |
|---|---|---|---|
| 3,925,139 | 12/1975 | Simmons | 219/497 |
| 4,270,693 | 6/1981 | Hayes . | |
| 4,374,321 | 2/1983 | Cunningham, Jr. . | |
| 4,388,692 | 6/1983 | Jones . | |
| 4,493,984 | 1/1985 | Yamaguchi | 219/505 |
| 4,504,010 | 3/1985 | Sukimoto et al. . | |
| 4,549,074 | 10/1985 | Matsuo | 219/505 |
| 4,564,749 | 1/1986 | Ishima | 219/497 |
| 4,598,195 | 7/1986 | Matsuo | 219/497 |
| 5,006,695 | 4/1991 | Elliott | 219/501 |
| 5,039,842 | 8/1991 | Kochajdu | 219/501 |

FOREIGN PATENT DOCUMENTS 3317941 11/1983 Fed. Rep. of Germany .

OTHER PUBLICATIONS

Patent Abstracts of Japan, vol. 9, No. 122 (P-359)[1845], May 18, 1985, Abstract only.
Patent Abstracts of Japan, vol. 10, No. 376 (E-464)[2433], Dec. 13, 1985, Abstract only.
Patent Abstracts of Japan, vol. 11, No. 49 (P-547)[2496], Feb. 14, 1987, Abstract only.

Primary Examiner—Mark H. Paschall
Attorney, Agent, or Firm—Frishauf, Holtz, Goodman & Woodward

[57] ABSTRACT

A fixing temperature controller comprising a heater for heating a fixing roller, a measuring circuit for detecting the fixing temperature of the fixing roller to produce detected temperature data, a first register for storing reference data for designating a fixing temperature for the fixing roller, a control circuit for comparing the reference data with the detected temperature data from the measuring circuit, and selectively activating the heater based on the comparison result. Particularly, the controller further comprises a second register for storing second reference data lower than the first reference data, and a selector for selecting one of the first and second reference data. The selector selects the first reference data and the control circuit activates the heater when it is detected that the detected temperature data < the reference data, and the selector selects the second reference data and the control circuit deactivates the heater when it is detected that the detected temperature ≧ the reference data.

21 Claims, 7 Drawing Sheets

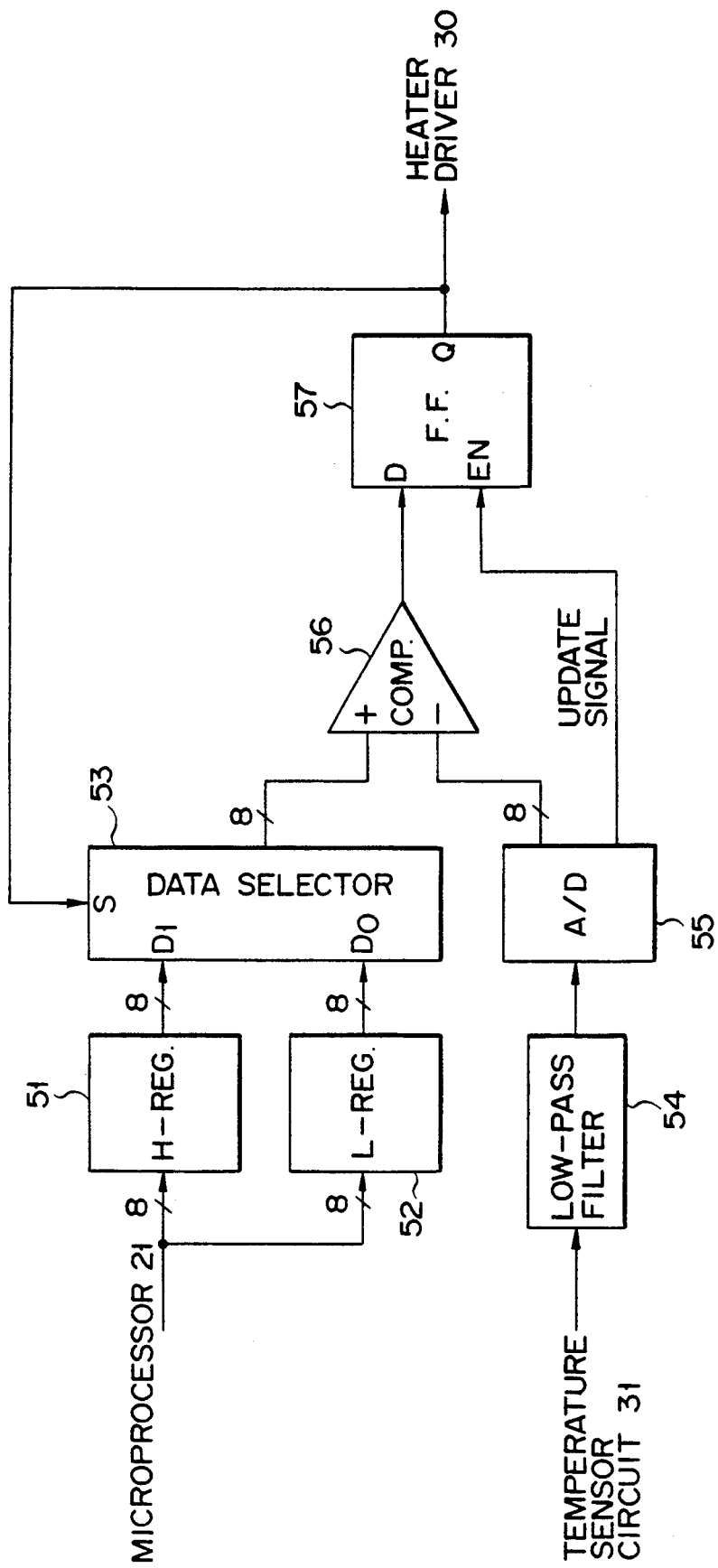
F I G. 6

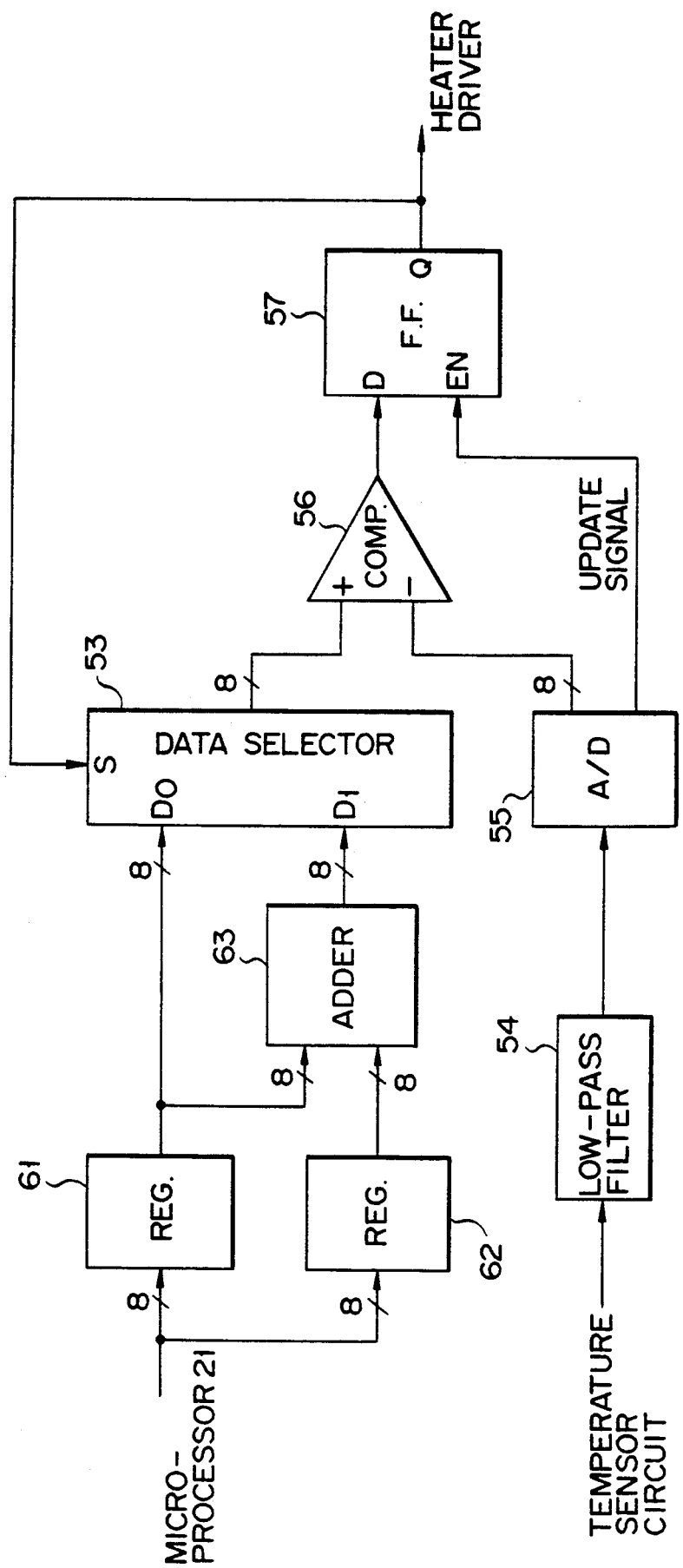
F I G. 8

FIXING TEMPERATURE CONTROLLER FOR CONTROLLING A HEATER RELATIVE TO TWO PRESET TEMPERATURE LEVELS

BACKGROUND OF THE INVENTION

1. Field of the Invention

The present invention relates to a fixing temperature controller for thermally fixing a developer image transferred on paper from a photosensitive body in, e.g., a laser printer.

2. Description of the Related Art

FIG. 1 shows an arrangement of a conventional fixing temperature controller.

This temperature controller has an 8-bit register 32 for storing reference data set beforehand by, e.g., a microprocessor. This reference data is used to hold the surface temperature of a heat roller 15 at a predetermined temperature required for fixing. The surface temperature of the heat roller is detected by a temperature sensor and supplied as a voltage signal corresponding to the detected temperature to a sample-and-hold circuit 33. The circuit 33 holds the analog voltage signal from the temperature sensor circuit 31 and supplies the signal to an A/D (analog/digital) converter 34. The A/D converter 34 converts the voltage signal into a digital value. A digital comparator 35 compares the reference data stored in the register 32 with the detected temperature data supplied from the A/D converter 34. If reference data > detected temperature data, the comparator 35 supplies a HIGH-level signal to a noise reduction circuit 36. If reference data ≦ detected temperature data, the comparator 35 supplies a LOW-level signal to the noise reduction circuit 36.

As shown in FIG. 2, the noise reduction circuit 36 has n series-connected D flip-flops $37_1$, $37_2$, $37_3$, ..., $37_n$ which operate in synchronism with clocks from a clock generator 38. An output signal from the comparator 35 is input to the first flip-flop $37_1$, and output signals from the flip-flops $37_1$ to $37_n$ are supplied in parallel to a majority decision circuit 39. The circuit 39 detects which of the HIGH or LOW level is larger in number in the n input signals and generates an output signal corresponding to the logic level larger in number. This output signal is supplied as an output signal from the noise reduction circuit 36 to a heater driver 30.

In the fixing temperature controller having the above arrangement, if the detected temperature data from the A/D converter 34 changes as indicated by (A) in FIG. 3, the comparator 35 generates an output signal which goes to HIGH level when reference data > detected temperature data and goes to LOW level when reference data ≦ detected temperature data, as indicated by (B) in FIG. 3. In correspondence with this change in output signal from the comparator 35, the noise reduction circuit 36 generates an output signal as indicated by (C) in FIG. 3. The heater driver 30 supplies power to a heater lamp 14 of a fixing unit when the output signal from the noise reduction circuit 36 is at HIGH level and cuts off the power supply to the heater lamp when it is at LOW level.

In the above noise reduction circuit 36, however, since the majority decision circuit 39 uses the result of operations of the flip-flips $37_1$ to $37_n$, a comparatively long delay is generated from a timing at which reaching of the surface temperature of the heat roller 15 to a predetermined temperature is detected to a timing at which the power supply to the heater lamp 14 is stopped. As a result, the surface temperature of the heat roller 15 is considerably overshot. Therefore, the fixing temperature cannot be controlled with high precision.

SUMMARY OF THE INVENTION

It is an object of the present invention to provide a fixing temperature controller capable of stopping power supply to a fixing unit immediately after the temperature of the fixing unit reaches a predetermined temperature, thereby minimizing an overshoot.

The above object of the present invention can be achieved by a fixing temperature controller which comprises a heater for heating a heat roller; a sensing circuit for detecting the fixing temperature of the fixing unit to produce detected temperature data; a data generating circuit for generating first and second reference data designating a fixing temperature for the heat roller; the second reference data being lower than the first reference data; a selector for selecting one of the first and second reference data; and a control circuit for comparing the reference data from the selector with the detected temperature data from the sensing circuit, and selectively activating the heater based on the comparison result; wherein the selector selects the first reference data and the control circuit activates the heater when it is detected that the detected temperature data < the reference data, and the selector selects the second reference data and the control circuit deactivates the heater when it is detected that the detected temperature ≧ the reference data.

In the present invention having the above arrangements, when heater is activated and the surface temperature of the heat roller rises, the detected temperature data from the sensing circuit gradually increases. While the temperature rises, the detected temperature data is compared with the first reference data. If detected temperature data ≧ first reference data, the control circuits cuts off the power supply to the heater, and the selector selects the second reference data in place of the first reference data. As a result, even if the detected temperature data slightly decreases, the power supply to the heater is kept cut off.

Thereafter, if the surface temperature of the heat roller falls to establish a relation of detected temperature data < second reference data, the control circuit restarts the power supply to the heater, and the selector selects the first reference data in place of the second reference data. As a result, the power supply to the heater is stably performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a block diagram showing in detail a circuit arrangement of a fixing temperature controller shown in FIG. 5;

FIG. 8 is a block diagram showing in detail a circuit arrangement of fixing temperature controller of a laser printer according to the second embodiment of the present invention.

DETAILED DESCRIPTION OF THE PREFERRED EMBODIMENTS

A laser printer according to the first embodiment of the present invention will be described below with reference to FIGS. 4 to 7.

Figure 1:
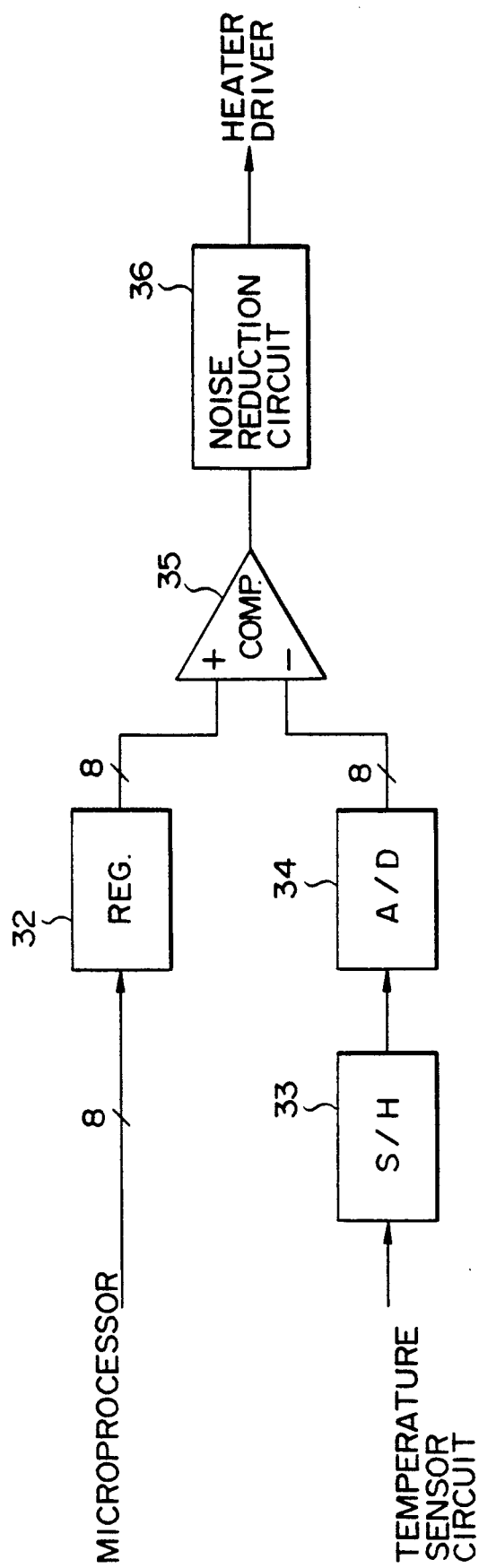
FIG. 1 is a block diagram showing an arrangement of a conventional fixing temperature controller.
Figure 2:
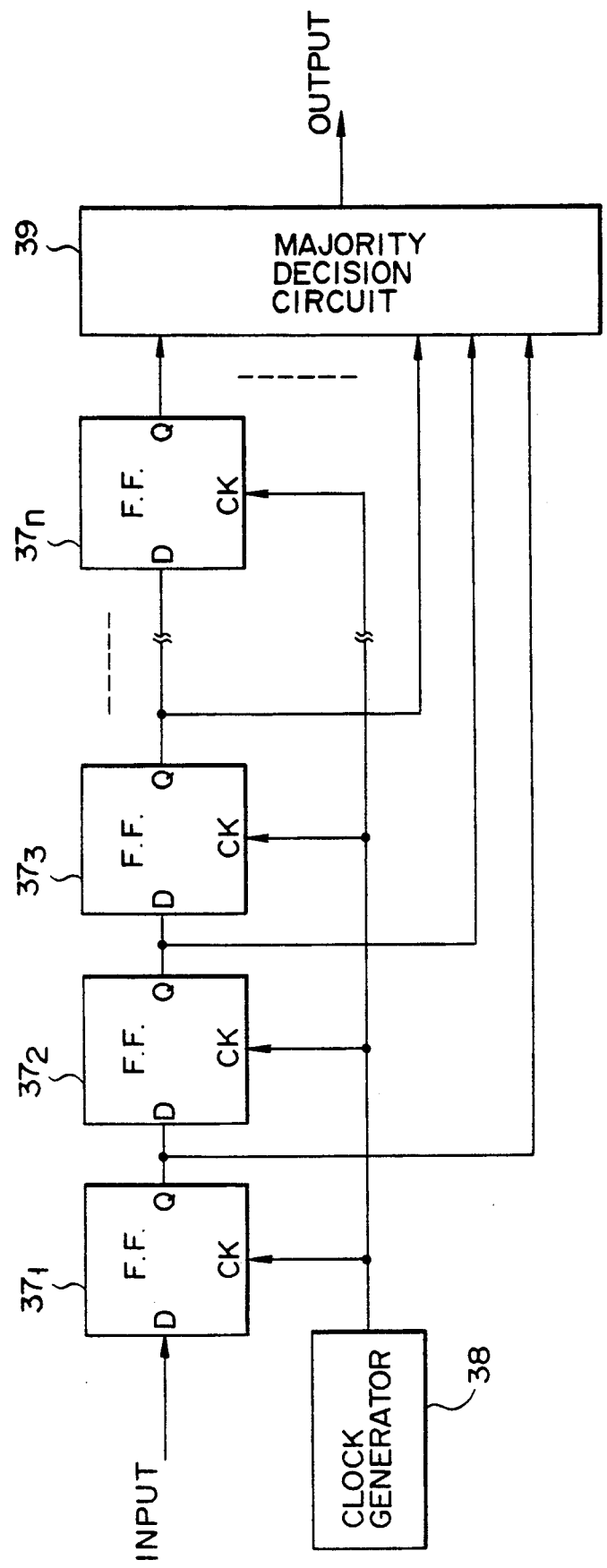
FIG. 2 is a block diagram showing in detail a noise reduction circuit shown in FIG. 1.
Figure 4:
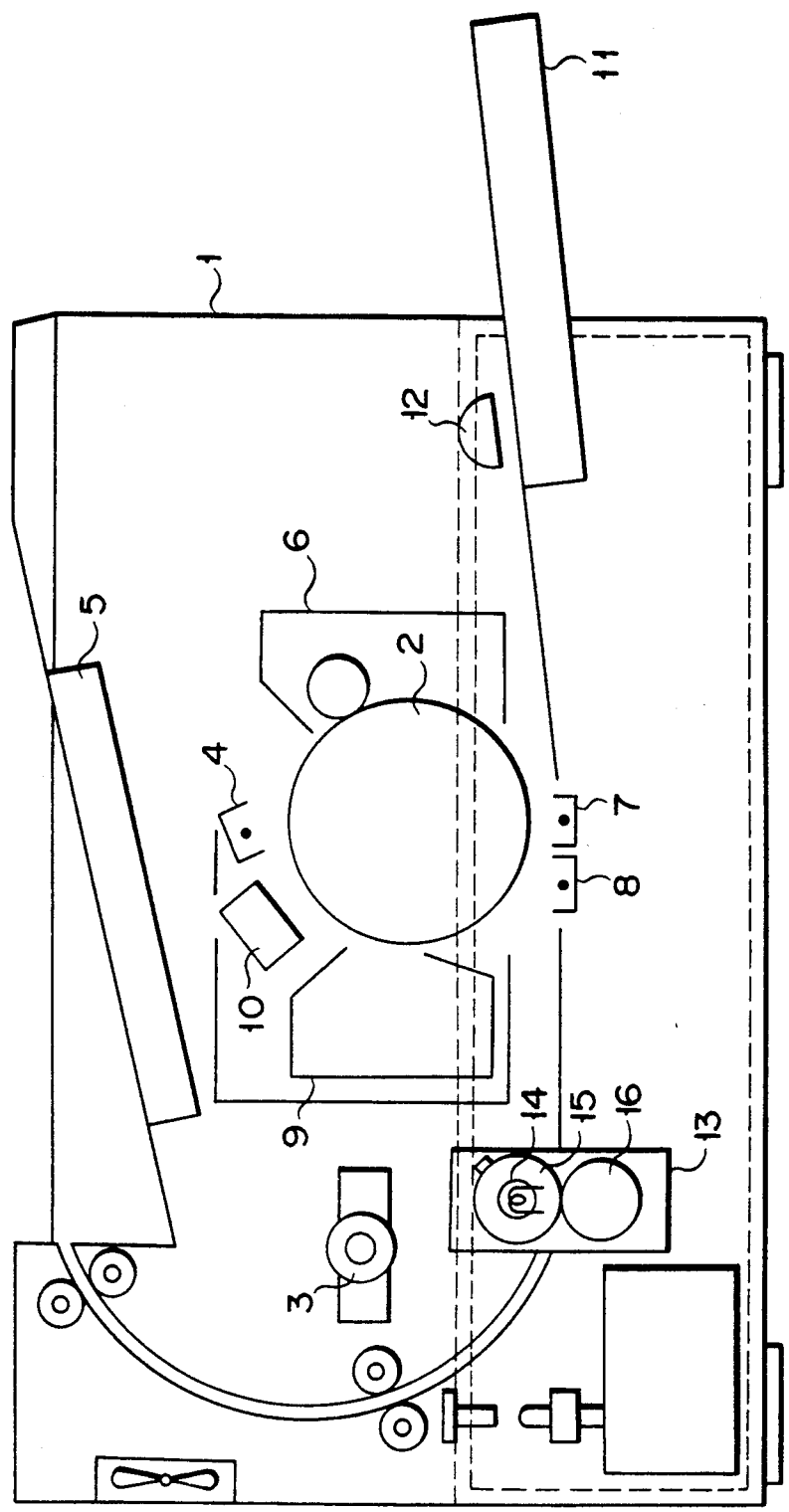
FIG. 4 is a sectional view showing an internal structure of a laser printer according to an embodiment of the present invention.

FIG. 4 shows an arrangement of this laser printer. The laser printer has a photosensitive drum 2 arranged in a substantially central portion of a housing 1 which can be separated into upper and lower portions. The photosensitive drum 2 is rotated in one direction, i.e., clockwise on the drawing surface by a drive motor 3. The laser printer further comprises electrophotographic process units arranged around the photosensitive drum 2, i.e., a charger unit 4 for charging the surface of the photosensitive drum 2 consisting of a photoconductive substance, a laser unit 5 for radiating a laser beam onto the photosensitive drum charged by the charger unit 4 to record image data as an electrostatic latent image, a developing unit 6 for depositing toner as a developer on the electrostatic latent image formed on the surface of the photosensitive drum, a transfer unit 7 for transferring the toner image of the photosensitive drum 2 onto paper fed to a predetermined transferring position, a discharger unit 8 for discharging an electric charge remaining on the paper, a cleaning unit 9 for removing toner from the photosensitive drum 2, and a discharger unit 10 for discharging the photosensitive drum 2 to prepare for the next charging. Sheets of paper are set in a paper cassette 11, picked up one by one from the cassette 11 by a pickup roller 12 which operates at a predetermined timing, and conveyed to the transfer unit 7. After a toner image is transferred onto the paper sheet by the transfer unit 7, the paper sheet is supplied to a fixing unit 13 to thermally fix the toner image. Thereafter, the paper sheet is exhausted outside the housing. The fixing unit 13 has a heat roller 15 incorporating a heater lamp 14 and a pressure roller 16 arranged to oppose the heat roller 15 so as to urge the toner image against the paper sheet. The surface temperature of the heat roller 15 is detected by a temperature-sensitive element in contact with the roller 15, e.g., a negative-resistance thermistor 17.

Figure 5:
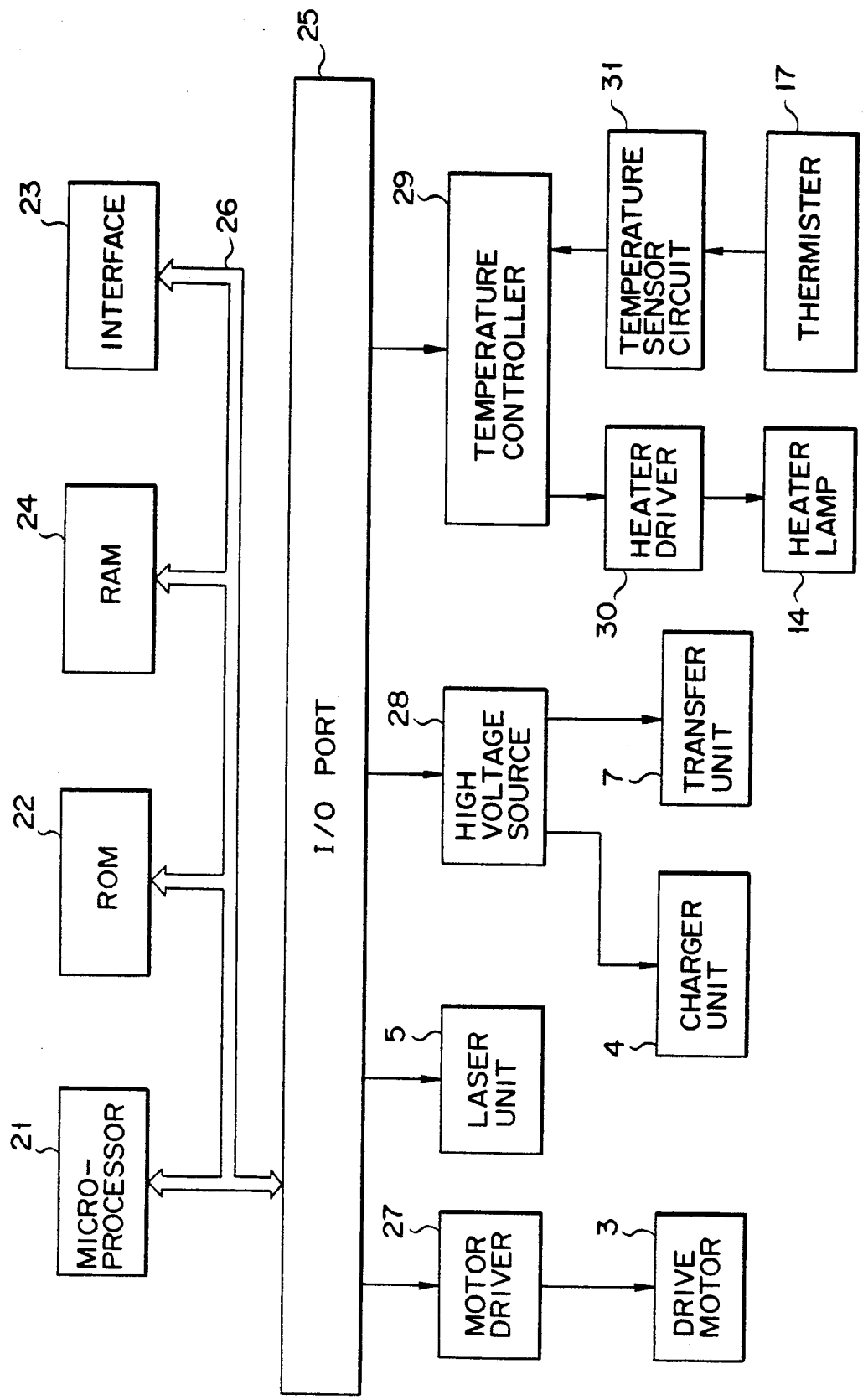
FIG. 5 is a block diagram showing a control circuit of the laser printer in FIG. 4.
Figure 3:
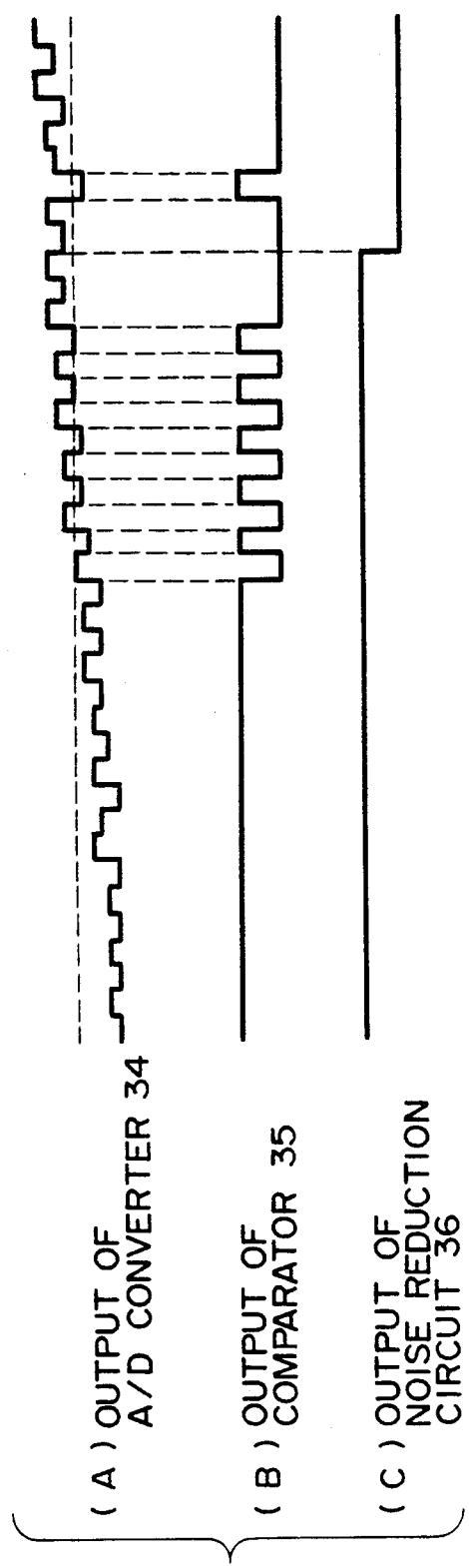
FIG. 3 is a timing chart showing an operation of the noise reduction circuit shown in FIG. 2.
Figure 7:
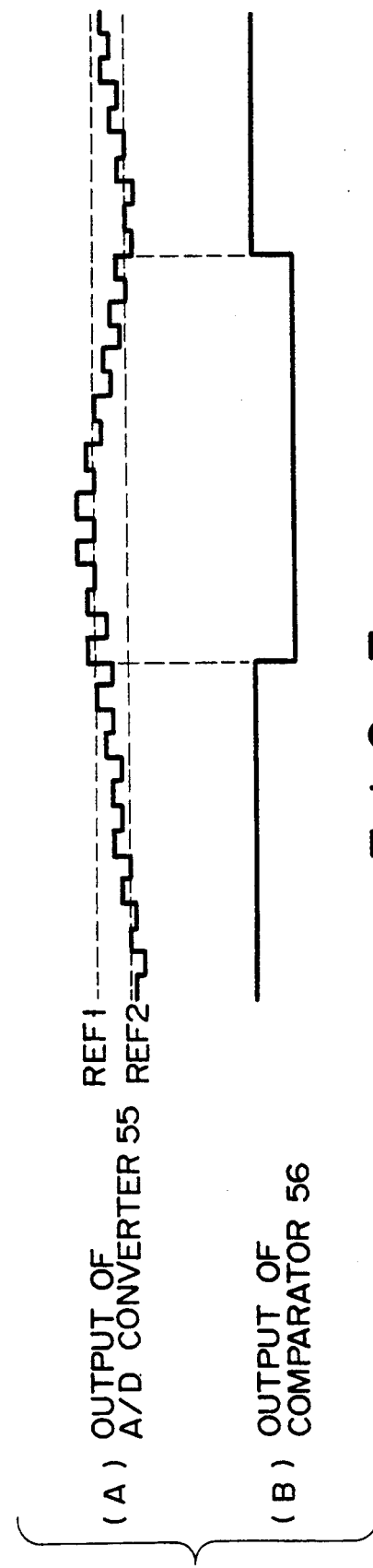
FIG. 7 is a timing chart showing an operation of the fixing temperature controller shown in FIG. 6.

FIG. 5 shows an arrangement of a control circuit of the above laser printer. This control circuit has a microprocessor 21 for performing data processing required to control components (to be described later), a ROM (Read-Only Memory) 22 for storing control program data of the microprocessor 21, an interface 23 for receiving image information and the like from an external device, and a RAM (Random Access Memory) 24 for storing the image information or various processing data supplied via the interface 23. These components are connected to an I/O port 25 through a bus line 26. The I/O port 25 is connected to a motor driver 27 for controlling driving of the drive motor 3, a high voltage source 28 for supplying a high voltage to the laser unit 5, the charger unit 4, and the transfer unit 7, a temperature controller 29, and the like. The temperature controller 29 is connected to a heater driver 30 for controlling power supply to the heater lamp 14, and a temperature sensor circuit 31 for converting a change in resistance of the thermistor 17 caused by a temperature change into a voltage signal. This laser printer has the temperature controller 29 in order to control the temperature of the fixing unit 13.

FIG. 6 shows an arrangement of the temperature controller 29. The temperature controller 29 has a high-data register 51 for storing first 8-bit reference data and a low-data register 52 for storing second 8-bit reference data slightly lower than the first reference data. The first and second reference data are set beforehand by the microprocessor 21. Note that the first reference data is used to hold the surface temperature of the heat roller 15 at a set temperature. The reference data stored in the data registers 51 and 52 are supplied to the first and second input ports of a data selector 53. The data selector 53 selectively outputs one of the first and second reference data from the data registers 51 and 52.

A low-pass filter 54 receives a voltage signal corresponding to the surface temperature of the heat roller supplied from the temperature sensor circuit 31 and supplies the signal to an A/D converter 55. The A/D converter 55 A/D-converts the supplied voltage signal into 8-bit detected temperature data. The reference data from the data selector 53 is supplied to the non-inverting input terminal (+) of a digital comparator 56, and the detected temperature data from the A/D converter 53 is supplied to its inverting input terminal (−). The digital comparator 56 generates an output signal which goes to HIGH level when detected temperature data < reference data and to LOW level when detected temperature data ≧ reference data. This output signal is supplied to a D flip-flop 57 constituting a latch circuit. The A/D converter 55 supplies a data update signal to the enable terminal of the D flip-flop 57 each time an A/D conversion operation is finished. An output signal from the flip-flop 57 is supplied to the heater driver 30 and a select terminal S of the data selector 53.

The heater driver 30 supplies power to the heater lamp 14 in response to the HIGH-level signal and cuts off the power supply to the heater lamp 14 in response to the LOW-level signal. The data selector 53 selects the first reference data from the high-data register 51 in response to the HIGH-level signal input to the select terminal S and selects the second reference data from the low-data register 52 in response to the LOW-level signal. In addition, the data selector 53 is arranged to select the first reference data from the high-data register 51 at the start of heating of the heat roller 15.

When power supply to the heater lamp 14 is started and the surface temperature of the heat roller 15 rises, the resistance of the thermistor 17 changes to increase the level of the voltage signal from the temperature sensor circuit 31. Therefore, the detected temperature data from the A/D converter 55 gradually increases as indicated by (A) in FIG. 7. While detected temperature data < first reference data, however, the output signal from the comparator 56 is kept at HIGH level as indicated by (B) in FIG. 7.

When the surface temperature of the heat roller 15 reaches a set temperature required for fixing, the detected temperature data ≧ first reference data is established. Therefore, the output signal from the comparator 56 goes to LOW level as indicated by (B) in FIG. 7. This LOW-level signal is immediately latched by the flip-flop 57 and output to the heater driver 30. The heater driver 30 cuts off the power supply to the heater lamp 14, and the data selector 53 selects the second reference data from the LOW-data register 52.

In the above embodiment, since the power supply to the heater lamp 14 can be cut off immediately after the surface temperature of the heat roller 15 reaches a set temperature required for thermal fixing, the surface temperature of the heat roller 15 is not largely overshot from the set temperature. Therefore, the fixing temperature can be controlled with high precision.

In addition, since the second reference data is input to the comparator 56 when the power supply to the heater lamp 14 is stopped, the output signal from the comparator can be stably held at LOW level even if the detected temperature data from the A/D converter 55 slightly decreases.

Thereafter, when the surface temperature of the heat roller 15 falls and the detected temperature data from the A/D converter 55 decreases to be lower than the second reference data, the output signal from the comparator 56 goes to HIGH level. As a result, the power supply to the heater lamp 14 is restarted, and the data selector 53 selects the first reference data. Therefore, the heat roller 15 is heated up to the set temperature again. In this manner, the surface temperature of the heat roller 15 is held around the set temperature based on the first reference data.

A laser printer according to the second embodiment of the present invention will be described below with reference to FIG. 8. Note that the second embodiment has the same arrangement as that of the above first embodiment except for a fixing temperature controller. Therefore, the same reference numerals as in the first embodiment denote the same parts in the second embodiment and a detailed description thereof will be omitted.

FIG. 8 shows an arrangement of the fixing temperature controller. This fixing temperature controller has a data register 61 for storing 8-bit low level reference data set beforehand by a microprocessor 21, and a data register 62 for storing 8-bit hysteresis data set in the same manner as the reference data. The low-level reference data stored in the data register 61 is supplied to a data selector 53 and an adder 63, and the hysteresis data stored in the data register 62 is supplied to the adder 63. The adder 63 adds the low-level reference data from the data register 61 to the hysteresis data from the data register 62 and outputs high-level reference data to the data selector 53. This high-level reference data is used to hold the surface temperature of a heat roller 15 at a set temperature. The data selector 53 selects one of the low-level reference data from the data register 61 and the high-level reference data from the adder 63 and supplies the selected data to the non-inverting input terminal (+) of a digital comparator 56. The inverting input terminal (−) of the digital comparator 56 receives 8-bit detected temperature data corresponding to the surface temperature of the heat roller 15 and supplied from an A/D converter 55. The digital comparator 56 generates an output signal which goes to HIGH level when detected temperature data < reference data and to LOW level when detected temperature data ≧ reference data, and supplied the output signal to a D flip-flop 57.

The data selector 53 is arranged to select the high-level reference data from the adder 63 in response to the HIGH-level signal supplied from the digital comparator 56 to its select terminal S and select the low-level reference data from the data register 61 when the signal is at LOW level.

In the above embodiment, the data selector 53 selects the high-level reference data from the adder 63 at the start of heating of the heat roller 15. When power supply to a heater lamp 14 is started and the surface temperature of the heat roller 15 rises, the resistance of a thermistor 17 changes to increase the level of a voltage signal from a temperature sensor circuit 31. In this manner, the detected temperature data from the A/D converter 55 gradually increases. While detected temperature data < high-level reference data, however, the output from the comparator 56 is kept at HIGH level.

When the surface temperature of the heat roller 15 reaches a set temperature required for thermal fixing, detected temperature data ≧ high-level reference data is established. As a result, the output signal from the comparator 56 goes to LOW level. This LOW level signal is immediately latched by the flip-flop 57 and output to a heater driver 30. The heater driver 30 cuts off the power supply to the heater lamp 14, and the data selector 53 selects the low-level reference data from the data register 61.

In the above embodiment, since power supply to the heater lamp 14 can be cut off immediately after the surface temperature of the heat roller 15 reaches a set temperature required for thermal fixing, the surface temperature of the heat roller 15 is not largely overshot from the set temperature. Therefore, as in the first embodiment, the fixing temperature can be controlled with high precision.

In addition, since the low-level reference data is input to the comparator 56 when the power supply to the heater lamp 14 is stopped, the output signal from the comparator can be stably held at LOW level even if the detected temperature data slightly decreases. Thereafter, when the surface temperature of the heat roller 15 falls and the detected temperature data from the A/D converter 55 decreases to be lower than the low-level reference data, the output signal from the comparator 56 goes to HIGH level. As a result, the power supply to the heater lamp 14 is restarted, and the data selector 53 selects the high-level reference data. Therefore, the heat roller 15 is heated up to the set temperature again. In this manner, the surface temperature of the heat roller 15 is held around the set temperature based on the high-level reference data.

Note that a heat roller is used to thermally fix a transferred image in the first and second embodiments, but the present invention is not limited to the above embodiments. For example, a member having a flat shape such as a belt conveyor may be adopted.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fixing temperature controller comprising:

heater means for heating a fixing unit;

sensing means for sensing a fixing temperature of said fixing unit and for periodically producing temperature data representing a sensed temperature; and control means for detecting the temperature data produced by said sensing means, said control means including means for enabling said heater means when said control means detects that the sensed fixing temperature has not increased above a first preset temperature level, and means for disabling said heater means when said control means detects that the sensed fixing temperature has increased above the first preset temperature level, said disabling of the heater means by said control means being continued until the sensed fixing temperature has decreased to a second preset temperature level which is lower than said first preset temperature level;

said control means further including:

data generating means for generating first and second reference data respectively representing said first and second preset temperature levels;

selecting means for selecting one of said first and second reference data, said first reference data being selected initially; and a single comparator for comparing the temperature data produced by said sensing means with the one selected reference data selected by said selecting means, for generating a first-level signal when said temperature data produced by said sending means is less than the one selected reference data, and for generating a second-level signal when said temperature data produced by said sensing means is greater then the one selected reference data.

2. The controller of claim 1, wherein said sensing means includes:

a temperature sensor formed in contact with a fixing roller of said fixing unit; and converting means for periodically converting an output signal from said temperature sensor to said temperature data.

3. The controller of claim 2, wherein:

said converting means includes signal generating means for generating an update signal for each conversion; and said control means further includes latching means for latching a signal from said comparing means in response to said update signal.

4. The controller of claim 3, wherein said selecting means includes a selector for selecting the first reference data when the first-level signal is latched by said latching means and for selecting the second reference data when the second-level signal is latched by said latching means.

5. The controller of claim 1, wherein said data generating means includes first and second register means for storing said first and second reference data.

6. The controller of claim 1, wherein said data generating means includes:

first and second register means for storing one of first and second reference data corresponding to a difference between said first and second reference data; and addition means for adding the data supplied from said first and second register means to output another one of said first and second reference data which is not stored in said first register means.

7. The controller of claim 1, wherein said fixing unit comprises a fixing roller, and said heater means is incorporated in said fixing roller of said fixing unit.

8. The controller of claim 1, wherein said selecting means selects said second reference data when said single comparator generates said second-level signal so that said single comparator then compares the temperature data produced by said sensing means with said second reference data.

9. The controller of claim 1, wherein said control means includes means for setting said first and second preset temperature level in advance.

10. The controller of claim 9, wherein said first and second preset temperatures levels are predetermined and fixed.

11. A fixing temperature controller comprising:

heater means for heating a fixing unit;

sensing means for sensing a fixing temperature of said fixing unit and for periodically producing digital temperature data representing a sensed temperature; and a single comparator for comparing the digital temperature data produced by said sensing means with respective digital reference data representing first and second preset temperature levels, said first preset temperature level being higher than said second present temperature level; and control means for enabling said heater means when said single comparator detects that the sensed fixing temperature has not increased above said first preset temperature level, and for disabling said heater means when said single comparator detects that the sensed fixing temperature has increased above said first preset temperature level, said disabling of said heater means being continued until the sensed fixing temperature has decreased to said second preset temperature level which is lower than said first preset temperature level.

12. The controller of claim 11, wherein said sensing means includes:

a temperature sensor formed in contact with a fixing roller of said fixing unit; and converting means for periodically converting an output signal from said temperature sensor to said digital temperature data.

13. The controller of claim 11, wherein said control means includes:

data generating means for generating said first and second digital reference data respectively representing said first and second preset temperature levels; and selecting means for selecting one of said first and second digital reference data, said first digital reference data being selected initially; and said single comparator comparing the digital temperature data produced by said sensing means with the one selected digital reference data selected by said selecting means for generating a first-level signal when the temperature data produced by said sensing means is less than the one selected reference data, and for generating a second-level signal when the digital temperature data produced by said sensing means is greater then the one selected digital reference data.

14. The controller of claim 13, wherein said selecting means selects said second reference data when said single comparator generates said second-level signal so that said single comparator then compares the temperature data produced by said sensing means with said second reference data.

15. The controller of claim 12, wherein:
said converting means includes signal generating means for generating an update signal for each conversion; and
said control means further includes latching means for latching a signal from said single comparator in response to said update signal.

16. The controller of claim 15, wherein said selecting means includes a selector for selecting the first reference data when the first-level signal is latched by said latching means, and for selecting the second reference data when the second-level signal is latched by said latching means.

17. The controller of claim 13, wherein said data generating means includes first and second register means for storing said first and second digital reference data.

18. The controller of claim 13, wherein said data generating means includes:
first and second register means for storing one of first and second digital reference data corresponding to a difference between said first and second digital reference data; and
addition means for adding the data supplied from said first and second register means to output another one of said first and second digital reference data which is not stored in said first register means.

19. The controller of claim 11, wherein said fixing unit comprises a fixing roller, and said heater means is incorporated in said fixing roller of said fixing unit.

20. The controller of claim 11, wherein said control means includes means for setting said first and second preset temperature level in advance.

21. The controller of claim 20, wherein said first and second preset temperatures levels are predetermined and fixed.

* * * * *